United States Patent
Smith et al.

(10) Patent No.: US 10,162,129 B2
(45) Date of Patent: Dec. 25, 2018

(54) INTERNAL HARNESSING MEMBERS AND METHOD FOR BEND CONTROL OF OPTICAL FIBERS IN CONNECTOR ASSEMBLIES

(71) Applicant: Ortronics, Inc., New London, CT (US)

(72) Inventors: Daniel M. Smith, Westerly, RI (US); Ryan J. Grandidge, Wakefield, RI (US); James Lucy, Westerly, RI (US); Alex Richard, Groton, CT (US); Randy L. Harris, Lenoir, NC (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 15/639,499

(22) Filed: Jun. 30, 2017

(65) Prior Publication Data

US 2018/0052287 A1    Feb. 22, 2018

Related U.S. Application Data

(60) Provisional application No. 62/377,002, filed on Aug. 19, 2016.

(51) Int. Cl.
  *G02B 6/38*    (2006.01)
(52) U.S. Cl.
  CPC ......... *G02B 6/3885* (2013.01); *G02B 6/3878* (2013.01); *G02B 6/3887* (2013.01)
(58) Field of Classification Search
  CPC ... G02B 6/3887; G02B 6/3878; G02B 6/3874
  USPC .................................... 385/77, 78, 8, 86, 87
  See application file for complete search history.

(56) References Cited

U.S. PATENT DOCUMENTS

| | | | | |
|---|---|---|---|---|
| 4,047,797 A | * | 9/1977 | Arnold | G02B 6/3887 385/134 |
| 6,764,220 B2 | * | 7/2004 | Griffiths | G02B 6/3878 385/135 |
| 6,985,665 B2 | * | 1/2006 | Baechtle | G02B 6/4472 385/134 |
| 7,281,856 B2 | * | 10/2007 | Grzegorzewska ... | G02B 6/3816 385/53 |
| 7,458,729 B2 | * | 12/2008 | Sasaki | G02B 6/3608 385/53 |
| 8,376,629 B2 | * | 2/2013 | Cline | G02B 6/3869 385/76 |
| 8,408,810 B2 | * | 4/2013 | Hoffmann | G02B 6/3821 385/60 |

(Continued)

*Primary Examiner* — Robert Tavlykaev
(74) *Attorney, Agent, or Firm* — McCarter & English, LLP

(57) ABSTRACT

Advantageous optical fiber harnessing members for connector assemblies and related methods of use are provided. The present disclosure provides improved harnessing members configured to provide bend control of optical fibers in connector assemblies, and related methods of use. More particularly, the present disclosure provides advantageous systems/methods for the design and use of internal harnessing members configured to provide bend control of optical fibers in duplex or quad uniboot connector assemblies. Disclosed herein are advantageous harnessing members providing bend control of optical fibers in connector assemblies (e.g., duplex or quad uniboot connector assemblies), thereby allowing optical fiber cable (e.g., light-construction cable, such as coated fiber with a 250 µm diameter) to be successfully and reliably deployed in such connector assemblies.

16 Claims, 13 Drawing Sheets

(56) References Cited

U.S. PATENT DOCUMENTS

| | | | |
|---|---|---|---|
| 8,662,760 B2* | 3/2014 | Cline | G02B 6/3887 385/76 |
| 2016/0259134 A1* | 9/2016 | Daems | G02B 6/3809 |

* cited by examiner

INTERNAL HARNESSING MEMBERS AND METHOD FOR BEND CONTROL OF OPTICAL FIBERS IN CONNECTOR ASSEMBLIES

CROSS-REFERENCE TO RELATED APPLICATIONS

This application claims the benefit of U.S. Provisional application entitled "INTERNAL HARNESSING MEMBERS AND METHOD FOR BEND CONTROL OF OPTICAL FIBERS IN CONNECTOR ASSEMBLIES," which was filed on Aug. 19, 2016, and assigned Ser. No. 62/377,002, the contents of which are herein incorporated by reference in their entirety.

FIELD OF THE DISCLOSURE

The present disclosure relates to harnessing members configured to provide bend control of optical fibers in connector assemblies and, more particularly to the design and use of internal harnessing members configured to provide bend control of optical fibers in duplex or quad uniboot connector assemblies.

BACKGROUND OF THE DISCLOSURE

In general and as shown in FIG. 1B, the housing H of a conventional connector U (e.g., LC type uniboot connector U) re-directs the fibers A, B from the cable entrance axis C to a pair of ferrule axes F1, F2. This typically requires each fiber A, B to bend at least twice, once to leave the axis C of the cable, and again to align with the axis F1, F2 of the ferrule to which it is terminated.

In general, the housing H internals are an empty space, providing room for the fibers A, B to flex, which for buffered and loose-tube fiber (e.g., fiber with a 600 µm or greater overall diameter) may be tolerable (e.g., so long as preparation lengths are well-controlled, and bend-optimized fiber is employed).

However, as cable quantities have increased, the market has been pushing for smaller and therefore lighter cable constructions. For example, such lighter cable constructions can employ coated fiber with a 250 µm diameter only. The small flexural modulus of such fiber construction means that it may naturally bend along a much tighter radius than buffered fiber would under equivalent load conditions. As a result, the fiber can bend to the point where the coating (e.g., plastic coating) can buckle, especially at the points where it exits the cable (C), and/or enters the ferrule (F1, F2), leading to unacceptably high insertion loss, and potentially to fracture of the fiber. This is what may be termed as a "macrobend" failure, and can be typified by a much higher insertion loss value at greater wavelengths.

For example, in single mode fiber testing, the 1310 nm and 1550 nm wavelengths are commonly examined simultaneously. A failed sample of this kind can exhibit much higher insertion loss at 1550 nm than at 1310 nm, though if the bend is sufficiently severe it may be unacceptable at both wavelengths. Further, because the fiber coating is typically polymeric, and thus prone to creep, insertion loss failures may take several days to fully manifest, enabling the product to pass factory inspection, or even during installation, only to fail later on.

Thus, an interest exists for improved connectors and related components, and related methods of use. These and other inefficiencies and opportunities for improvement are addressed and/or overcome by the assemblies, systems and methods of the present disclosure.

SUMMARY OF THE DISCLOSURE

The present disclosure provides advantageous optical fiber harnessing members for connector assemblies, and improved methods/systems for using the same. The present disclosure provides advantageous harnessing members configured to provide bend control of optical fibers in connector assemblies, and related methods of use. More particularly, the present disclosure provides improved systems/methods for the design and use of internal harnessing members configured to provide bend control of optical fibers in duplex or quad uniboot connector assemblies.

In exemplary embodiments, disclosed herein are advantageous harnessing members providing bend control of optical fibers in connector assemblies (e.g., duplex or quad uniboot connector assemblies), thereby allowing optical fiber cable (e.g., light-construction cable, such as coated fiber with a 250 µm diameter) to be successfully and reliably deployed in such connector assemblies.

The present disclosure provides for a connector assembly including a housing having an internal region that extends from a first end to a second end and includes a first sidewall and a second sidewall, the first end of the internal region connected to a cable channel and the second end of the internal region connected to a first ferrule channel and to a second ferrule channel; a cable positioned within the cable channel; a first ferrule positioned within the first ferrule channel and a second ferrule positioned within the second ferrule channel; a first optical fiber extending from the cable to the first ferrule, and a second optical fiber extending from the cable to the second ferrule; a first harnessing member disposed in the internal region and positioned proximal to the first sidewall, the first end and the cable channel, the first harnessing member including a first curved surface; a second harnessing member disposed in the internal region and positioned proximal to the second sidewall, the first end and the cable channel, the second harnessing member including a second curved surface; a third harnessing member disposed in the internal region and positioned proximal to the second end, the third harnessing member including a third curved surface; wherein when the first optical fiber extends from the cable to the first ferrule, the first optical fiber engages and abuts against the first curved surface of the first harnessing member and the third curved surface of the third harnessing member; and wherein when the second optical fiber extends from the cable to the second ferrule, the second optical fiber engages and abuts against the second curved surface of the second harnessing member and the third curved surface of the third harnessing member.

The present disclosure also provides for a connector assembly wherein the housing includes a first housing member and a second housing member defining and enclosing the internal region, the housing defining an LC type uniboot housing; and wherein the cable is a two-fiber cable.

The present disclosure also provides for a connector assembly wherein the first and second sidewalls extend perpendicular from a base wall of the internal region; wherein the first, second and third harnessing members extend and protrude from the base wall of the internal region; and wherein the first, second and third curved surfaces extend and protrude from the base wall of the internal region.

The present disclosure also provides for a connector assembly wherein the first curved surface extends from a position proximal to the first sidewall to a position proximal to the cable channel; and wherein the second curved surface extends from a position proximal to the second sidewall to a position proximal to the cable channel.

The present disclosure also provides for a connector assembly wherein the first and second curved surfaces are quadrant shaped surfaces; and wherein the third curved surface is a semi-circle shaped surface. The present disclosure also provides for a connector assembly wherein the third curved surface extends from a position proximal to the first ferrule to a position proximal to the second ferrule.

The present disclosure also provides for a connector assembly wherein the first, second and third harnessing members extend and protrude from an insert wall of an insert member, the insert member configured and dimensioned to be disposed and secured within the internal region of the housing.

The present disclosure also provides for a method for fabricating a connector assembly including providing a housing having an internal region that extends from a first end to a second end and includes a first sidewall and a second sidewall, the first end of the internal region connected to a cable channel and the second end of the internal region connected to a first ferrule channel and to a second ferrule channel; positioning a cable within the cable channel; positioning a first ferrule within the first ferrule channel; positioning a second ferrule within the second ferrule channel; extending a first optical fiber from the cable to the first ferrule; extending a second optical fiber from the cable to the second ferrule; disposing and positioning a first harnessing member in the internal region proximal to the first sidewall, the first end and the cable channel, the first harnessing member including a first curved surface; disposing and positioning a second harnessing member in the internal region proximal to the second sidewall, the first end and the cable channel, the second harnessing member including a second curved surface; disposing and positioning a third harnessing member in the internal region proximal to the second end, the third harnessing member including a third curved surface; wherein when the first optical fiber extends from the cable to the first ferrule, the first optical fiber engages and abuts against the first curved surface of the first harnessing member and the third curved surface of the third harnessing member; and wherein when the second optical fiber extends from the cable to the second ferrule, the second optical fiber engages and abuts against the second curved surface of the second harnessing member and the third curved surface of the third harnessing member.

The present disclosure also provides for a connector assembly including a housing having an internal region that extends from a first end to a second end and includes a first sidewall and a second sidewall, the first end of the internal region connected to a cable channel and the second end of the internal region connected to a first ferrule channel, a second ferrule channel, a third ferrule channel and a fourth ferrule channel; a cable positioned within the cable channel; a first ferrule positioned within the first ferrule channel, a second ferrule positioned within the second ferrule channel, a third ferrule positioned within the third ferrule channel, and a fourth ferrule positioned within the fourth ferrule channel; a first optical fiber extending from the cable to the first ferrule, a second optical fiber extending from the cable to the second ferrule, a third optical fiber extending from the cable to the third ferrule, and a fourth optical fiber extending from the cable to the fourth ferrule; a first harnessing member disposed in the internal region and positioned proximal to the first sidewall, the first end and the cable channel, the first harnessing member including a first curved surface; a second harnessing member disposed in the internal region and positioned proximal to the second sidewall, the first end and the cable channel, the second harnessing member including a second curved surface; a third harnessing member disposed in the internal region and positioned proximal to the second end, the third harnessing member including a third curved surface; a fourth harnessing member disposed in the internal region, the fourth harnessing member extending from a position proximal to the first ferrule to a position proximal to the first end of the internal region, the fourth harnessing member including an exterior curved surface and an interior curved surface; a fifth harnessing member disposed in the internal region, the fifth harnessing member extending from a position proximal to the fourth ferrule to a position proximal to the first end of the internal region, the fifth harnessing member including an exterior curved surface and an interior curved surface; wherein when the first optical fiber extends from the cable to the first ferrule, the first optical fiber engages and abuts against the first curved surface of the first harnessing member and the exterior curved surface of the fourth harnessing member; wherein when the second optical fiber extends from the cable to the second ferrule, the second optical fiber engages and abuts against the interior curved surface of the fourth harnessing member and the third curved surface of the third harnessing member; wherein when the third optical fiber extends from the cable to the third ferrule, the third optical fiber engages and abuts against the interior curved surface of the fifth harnessing member and the third curved surface of the third harnessing member; wherein when the fourth optical fiber extends from the cable to the fourth ferrule, the fourth optical fiber engages and abuts against the second curved surface of the second harnessing member and the exterior curved surface of the fifth harnessing member.

The present disclosure also provides for a connector assembly wherein the housing includes a first housing member and a second housing member defining and enclosing the internal region, the housing defining an LC type uniboot housing; and wherein the cable is a four-fiber cable.

The present disclosure also provides for a connector assembly wherein the first and second sidewalls extend perpendicular from a base wall of the internal region; wherein the first, second, third, fourth and fifth harnessing members extend and protrude from the base wall of the internal region; and wherein the first, second and third curved surfaces extend and protrude from the base wall of the internal region.

The present disclosure also provides for a connector assembly wherein the first curved surface extends from a position proximal to the first sidewall to a position proximal to the cable channel; and wherein the second curved surface extends from a position proximal to the second sidewall to a position proximal to the cable channel.

The present disclosure also provides for a connector assembly wherein the third curved surface is a semi-circle shaped surface; and wherein the third curved surface extends from a position proximal to the second ferrule to a position proximal to the third ferrule.

The present disclosure also provides for a connector assembly wherein the second and third ferrules are positioned between the first and fourth ferrules.

The present disclosure also provides for a connector assembly wherein the housing includes a first housing member and a second housing member defining and enclosing the internal region, the first housing member including a latching member; wherein the first ferrule includes a first interface member, the second ferrule includes a second interface member, the third ferrule includes a third interface member, and the fourth ferrule includes a fourth interface member; and wherein the latching member is configured to mount to the second and third interface members.

The present disclosure also provides for a connector assembly wherein the second and third interface members are positioned between the first and fourth interface members. The present disclosure also provides for a connector assembly wherein the second interface member includes a first latch and the third interface member includes a second latch, the first and second latches configured to mount to the latching member.

The present disclosure also provides for a connector assembly wherein the latching member includes a first latch and a second latch, the first latch configured to mount to the second interface member and the second latch configured to mount to the third interface member.

The present disclosure also provides for a method for detecting optical fiber macro-bending including providing a connector assembly having optical fibers; attaching the connector assembly to a test adapter; forcing the connector assembly into the test adapter to artificially increase the ferrule travel of the connector assembly; and monitoring the insertion loss of the connector assembly at a pre-determined wavelength.

The present disclosure also provides for a method for detecting optical fiber macro-bending wherein the connector assembly is an LC type uniboot connector assembly; and wherein the pre-determined wavelength is about 1550 nm for singlemode fiber testing and about 1300 nm for multimode fiber testing.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 13 is an image showing a close-up of a testing screen of FIG. 12;

FIG. 15 is an image showing a close-up of a testing screen of FIG. 14;

DETAILED DESCRIPTION OF DISCLOSURE

Figure 1A:
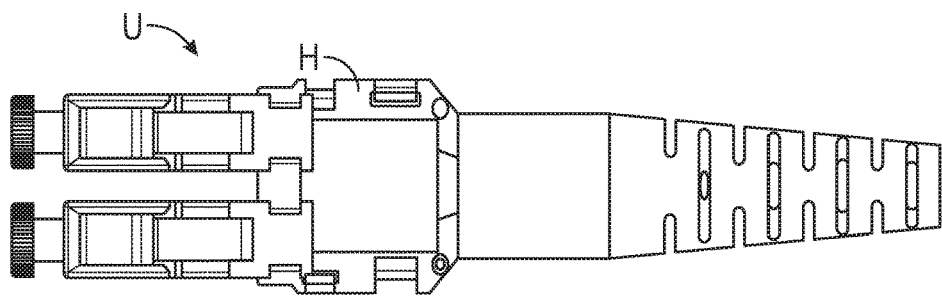
FIGS. 1A and 1B are partial top views of a conventional connector.
Figure 1B:
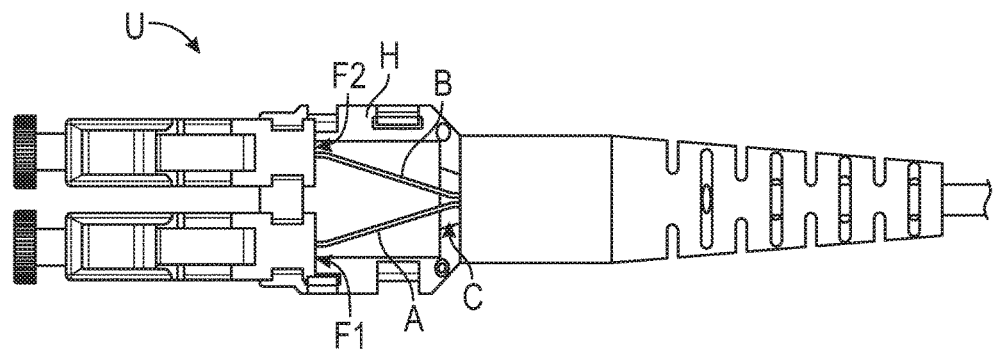
Figure 2:
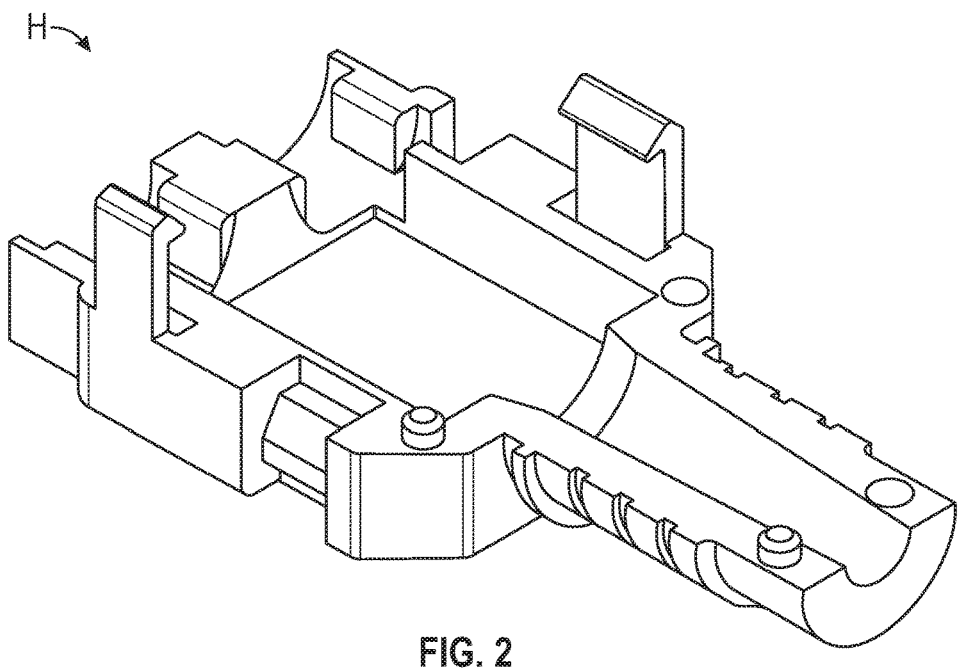
FIG. 2 is a top perspective view of a conventional housing for use with the connector of FIGS. 1A and 1B.
Figure 3:
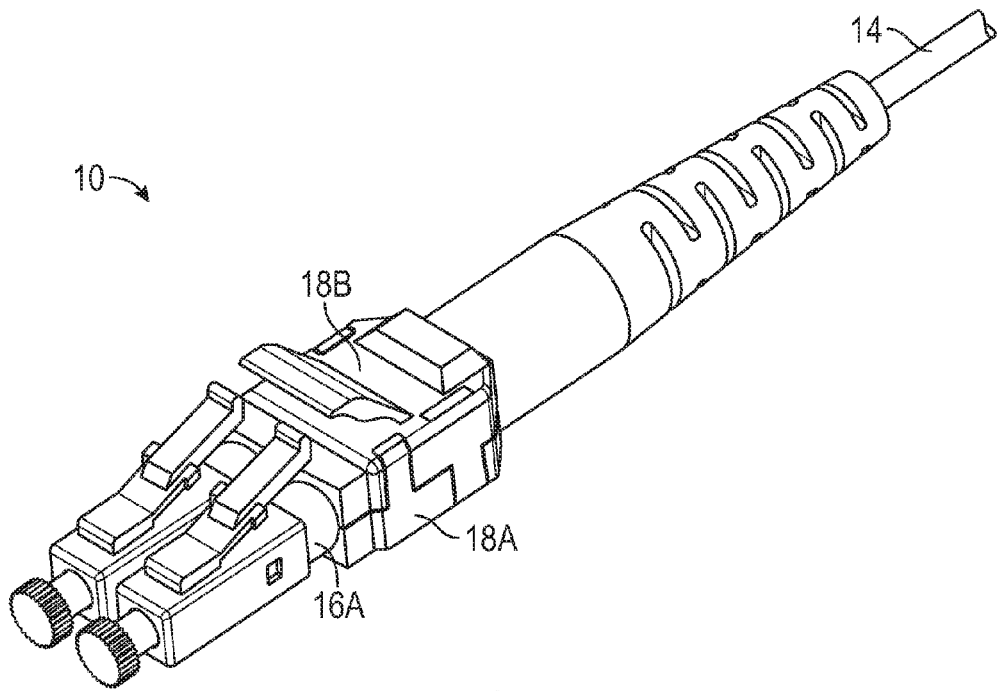
FIG. 3 is a top perspective view of an exemplary connector assembly utilizing advantageous internal harnessing members of the present disclosure.

The exemplary embodiments disclosed herein are illustrative of advantageous optical fiber harnessing members for connector assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems and/or alternative assemblies of the present disclosure.

The present disclosure provides optical fiber harnessing members for connector assemblies, and related methods of use. The present disclosure provides advantageous harnessing members configured to provide bend control of optical fibers in connector assemblies, and related methods of use. More particularly, the present disclosure provides advantageous systems/methods for the design and use of internal harnessing members configured to provide bend control of optical fibers in duplex or quad uniboot connector assemblies.

In general, disclosed herein are advantageous harnessing members providing bend control of optical fibers in connector assemblies (e.g., duplex or quad uniboot connector assemblies), thereby allowing optical fiber cable (e.g., light-construction cable, such as coated fiber with a 250 μm diameter) to be successfully and reliably deployed in such connector assemblies.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 3-7, there is illustrated an embodiment of an exemplary connector assembly 10 according to the present disclosure. In general, connector assembly 10 is configured and dimensioned to hold/house optical fibers 12A, 12B of an optical fiber cable 14 (e.g., two-fiber cable 14), and is configured to align the optical fibers 12A, 12B for mating/connecting via ferrules 16A, 16B. Exemplary connector assembly 10 takes the form of an LC type duplex uniboot connector assembly 10 or the like, although the present disclosure is not limited thereto.

Exemplary connector assembly 10 includes housing members 18A, 18B (e.g., backshell housing members 18A, 18B). In general, housing members 18A, 18B are configured to mate to one another, and are configured to provide an internal region or area 20 for housing optical fibers 12A, 12B.

Figure 4:
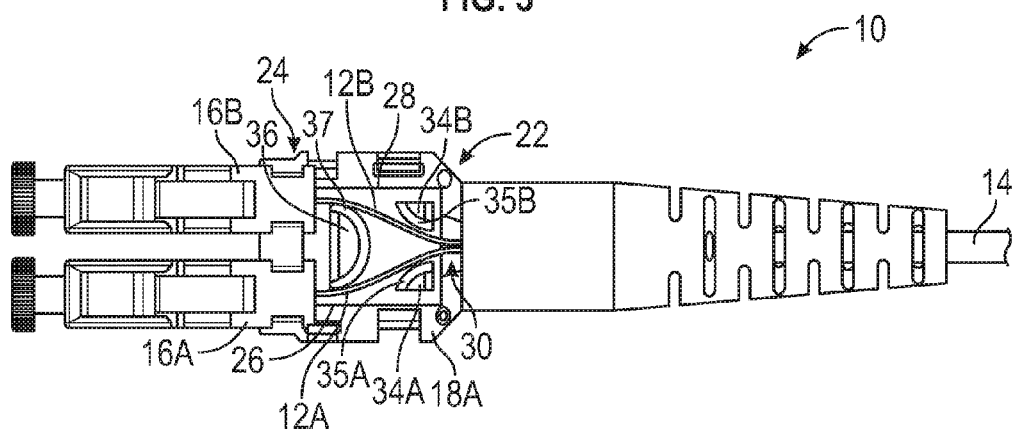
FIGS. 4-5 are partial top views of the connector assembly of FIG. 3.
Figure 5:
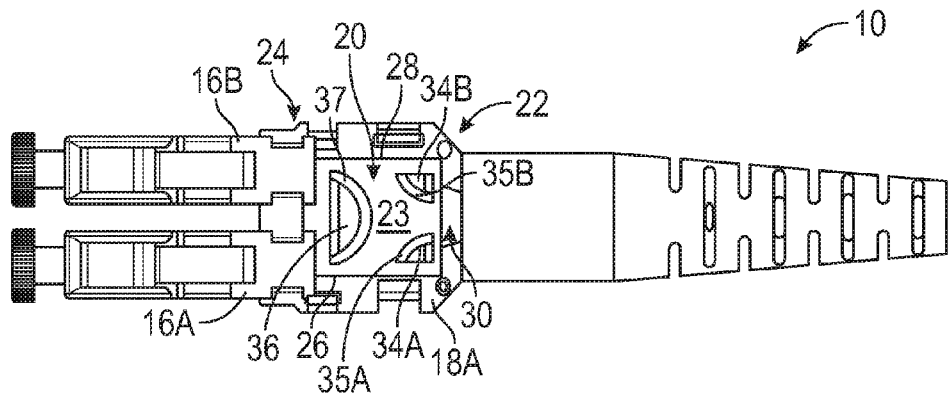

In exemplary embodiments and as shown in FIGS. 4-8, the internal region/area 20 of housing 18A extends from a first end 22 to a second end 24, and includes a first sidewall 26 and a second sidewall 28, the first and second sidewalls 26, 28 extending perpendicular to a base wall 23 (e.g., planar base wall 23) of region 20 (FIG. 5).

Figure 6:
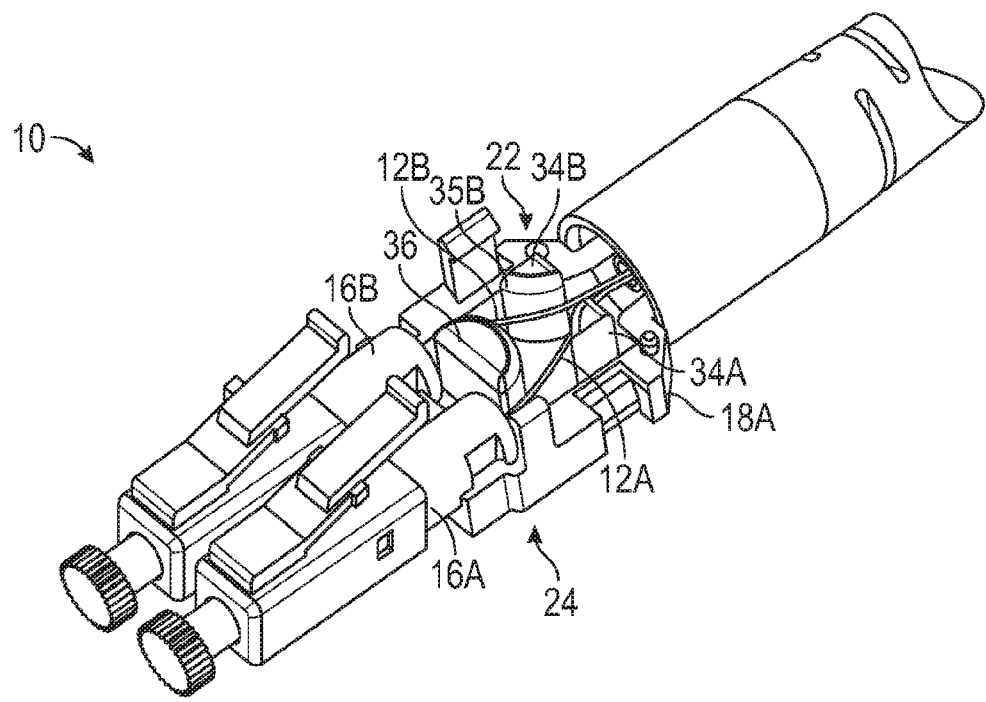
FIGS. 6-7 are partial top perspective views of the connector assembly of FIG. 3.
Figure 7:
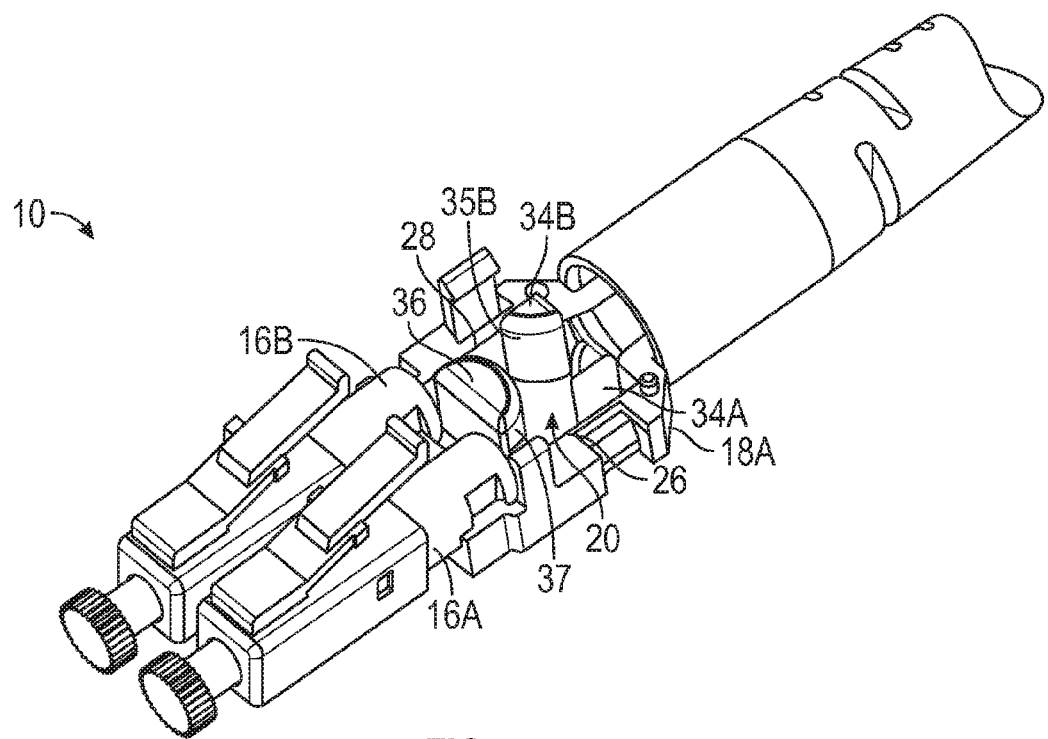
Figure 8:
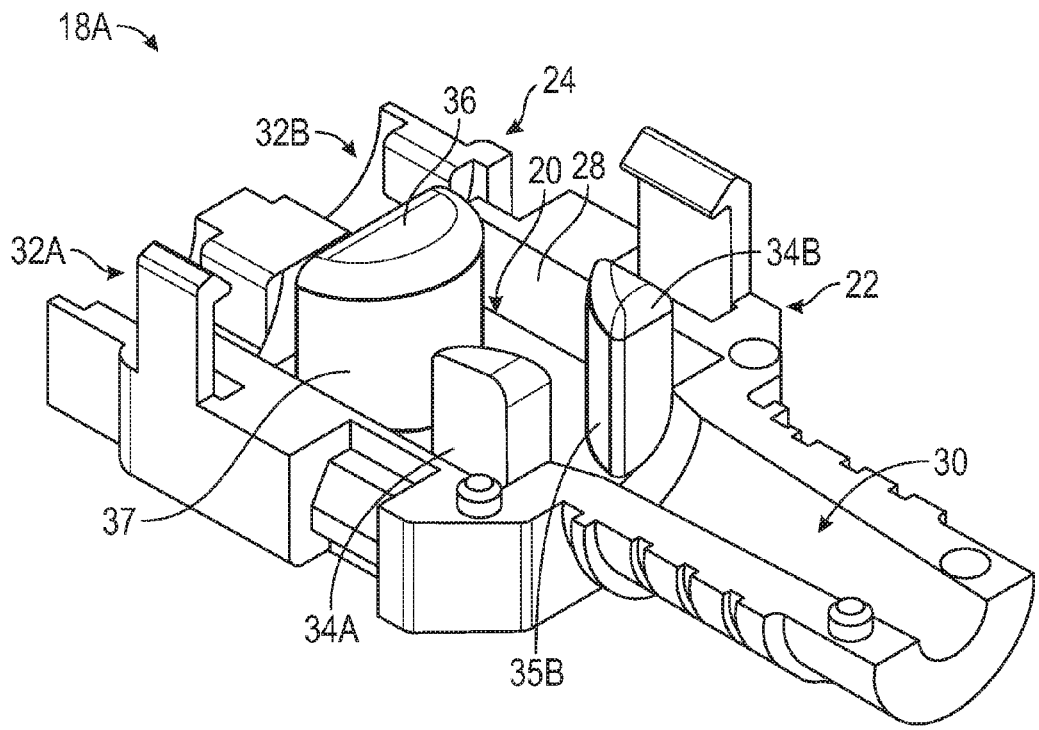
FIG. 8 is a top perspective view of an exemplary housing member having harnessing members.

As shown in FIG. 8, the first end 22 of the internal region 20 is connected to cable channel 30, and the second end 24 of the internal region 20 is connected to ferrule channels 32A, 32B. As shown in FIGS. 4 and 6, optical fiber cable 14 is configured to be positioned within cable channel 30, ferrule 16A is configured to be positioned within ferrule channel 32A, and ferrule 16B is configured to be positioned within ferrule channel 32B. As such, optical fiber 12A is configured to exit cable 14 and extend to ferrule 16A, and optical fiber 12B is configured to exit cable 14 and extend to ferrule 16B.

In exemplary embodiments, the first end 22 of internal region 20 includes harnessing members 34A, 34B that extend or protrude from the base wall 23, and the second end 24 of internal region 20 includes harnessing member 36 that extends or protrudes from base wall 23.

In certain embodiments, harnessing member 34A is positioned proximal to first sidewall 26, proximal to first end 22 and proximal to cable channel 30. Exemplary harnessing member 34B is positioned proximal to second sidewall 28, proximal to first end 22 and proximal to cable channel 30. Harnessing member 36 is positioned proximal to second end 24, and extends from a position that is proximal to ferrule 16A to a position that is proximal to ferrule 16B.

Exemplary harnessing member 34A includes a curved and contoured surface 35A (e.g., a quadrant shaped surface 35A) that extends from a position that is proximal to first sidewall 26 to a position that is proximal to cable channel 30. Similarly, exemplary harnessing member 34B includes a curved and contoured surface 35B (e.g., a quadrant shaped surface 35B) that extends from a position that is proximal to second sidewall 28 to a position that is proximal to cable channel 30. In general, exemplary surfaces 35A, 35B also extend or protrude from the base wall 23.

Exemplary harnessing member 36 includes a curved and contoured surface 37 (e.g., a semi-circle shaped surface 37) that extends from a position that is proximal to ferrule 16A to a position that is proximal to ferrule 16B. Exemplary surface 37 also extends or protrudes from the base wall 23.

In general, harnessing members 34A, 34B, 36 provide bend control and reinforcement for fibers 12A, 12B within housing 18A so that connector assembly 10 operates reliably by eliminating macrobend failure of fibers 12A, 12B.

More particularly, when optical fiber 12A exits cable channel 30 and extends to ferrule 16A, the fiber 12A first engages and abuts against the contoured surface 35A of harnessing member 34A, and then engages and abuts against the contoured surface 37 of harnessing member 36, and then extends into ferrule 16A (FIG. 4). As such, fiber 12A abuts against surfaces 35A, 37, and these surfaces 35A, 37 advantageously provide that fiber 12A is substantially straight as fiber 12A exits channel 30, and provides that fiber 12A is substantially straight as fiber 12A enters ferrule 16A, thereby substantially eliminating these two points of stress concentration of fiber 12A. The bends of fiber 12A are controlled by being forced against two rounded surfaces 35A, 37, thereby limiting the overall minimum fiber bend radius of fiber 12A to a tolerable value.

Similarly, when optical fiber 12B exits cable channel 30 and extends to ferrule 16B, the fiber 12B first engages and abuts against the contoured surface 35B of harnessing member 34B, and then engages and abuts against the contoured surface 37 of harnessing member 36, and then extends into ferrule 16B (FIG. 4). As such, fiber 12B abuts against surfaces 35B, 37, and these surfaces 35B, 37 advantageously provide that fiber 12B is substantially straight as fiber 12B exits channel 30, and provides that fiber 12B is substantially straight as fiber 12B enters ferrule 16B, thereby substantially eliminating these two points of stress concentration of fiber 12B. The bends of fiber 12B are controlled by being forced against two rounded surfaces 35B, 37, thereby limiting the overall minimum fiber bend radius of fiber 12B to a tolerable value.

This was proven in a test in which a conventional singlemode connector with known macrobend issues, as showcased by a greater than 2.50 dB rise in insertion loss at 1550 nm during "push-in" testing, had its housing removed and replaced by an exemplary housing 18A with harnessing members 34A, 34B, 36 having control contoured surfaces 35A, 35B, 37 included on housing 18A. The terminated LC connectors and cable preparation were kept unaltered. In subsequent "push-in" testing, the insertion loss rise at 1550 nm was reduced to no more than 0.05 dB, thus changing the assembly from a failing result to a passing result.

It is noted that the present disclosure provides for other systems/assemblies of implementing the advantageous bend control for fibers 12A, 12B. In general, a reinforcement of the fibers 12A, 12B can be expected to improve conditions of assembly 10.

Figure 9:
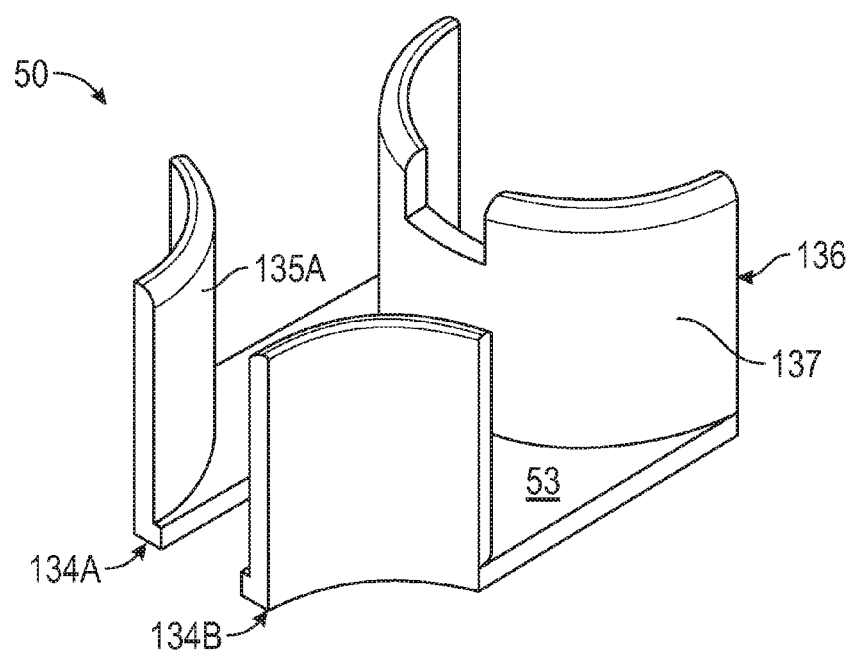
FIG. 9 is a top perspective view of an exemplary insert member having harnessing members.
Figure 10:
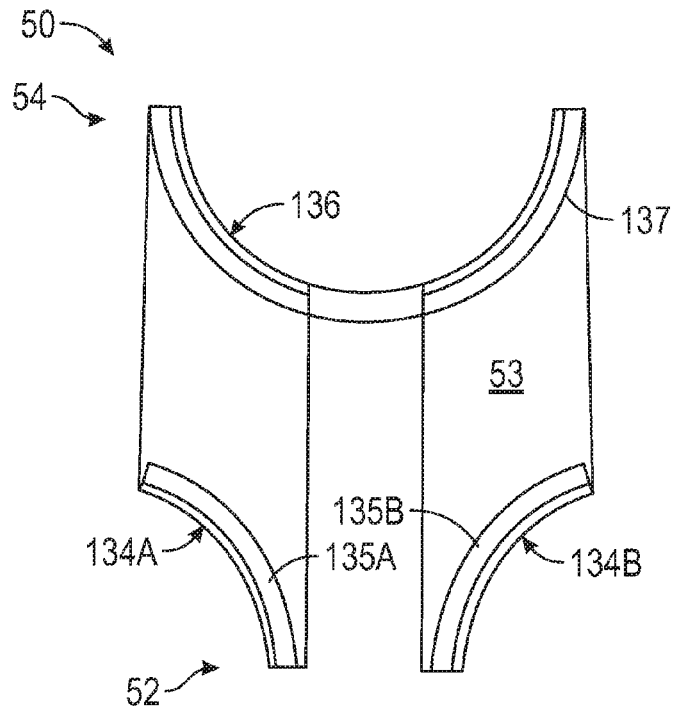
FIG. 10 is a top view of the insert member of FIG. 9.
Figure 11:
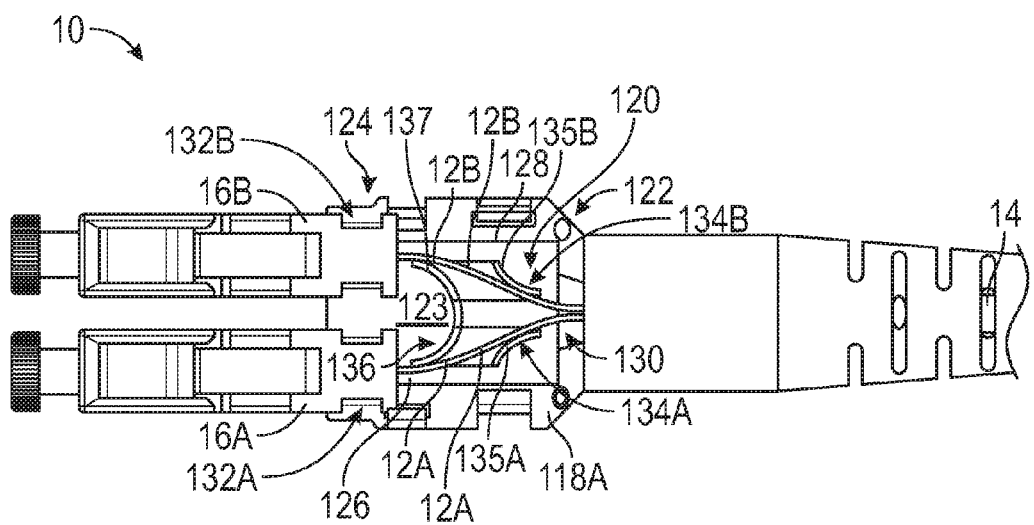
FIG. 11 is a top view of an exemplary connector assembly utilizing an advantageous insert member of the present disclosure.

For example and in an alternative embodiment, a separate harnessing insert member 50 can be inserted into internal region 120 of housing 118A of connector assembly 10 (FIGS. 9-11). As discussed further below, exemplary insert member 50 can be sized to fit tightly within internal region 120 of housing 118A, and secured in place, so as not to move, and insert member 50 can be configured to not allow the fibers 12A, 12B to escape from the path set by the control contoured surfaces 135A, 135B, 137 of insert member 50. In some embodiments, insert member 50 takes the form of a metal stamping which surrounds the fibers 12A, 12B, and which uses leaf spring elements to ensure tight fit within the internal region 120.

In exemplary embodiments and as shown in FIG. 11, the internal region/area 120 of housing 118A extends from a first end 122 to a second end 124, and includes a first sidewall 126 and a second sidewall 128, the first and second sidewalls 126, 128 extending perpendicular to a base wall 123 of region 120.

The first end 122 of the internal region 120 is connected to cable channel 130, and the second end 124 of the internal region 120 is connected to ferrule channels 132A, 132B. Optical fiber cable 14 is configured to be positioned within cable channel 130, ferrule 16A is configured to be positioned within ferrule channel 132A, and ferrule 16B is configured to be positioned within ferrule channel 132B. As such, optical fiber 12A is configured to exit cable 14 and extend to ferrule 16A, and optical fiber 12B is configured to exit cable 14 and extend to ferrule 16B.

In exemplary embodiments, a first end 52 of insert member 50 includes harnessing members 134A, 134B that extend or protrude from insert wall 53, and a second end 54 of insert member 50 includes harnessing member 136 that extends or protrudes from insert wall 53.

In certain embodiments and after securing insert member 50 to internal region 120 of housing 118A, harnessing member 134A is positioned proximal to first sidewall 126, proximal to first end 122 and proximal to cable channel 130. Exemplary harnessing member 134B is positioned proximal to second sidewall 128, proximal to first end 122 and proximal to cable channel 130. Harnessing member 136 is positioned proximal to second end 124, and extends from a position that is proximal to ferrule 16A to a position that is proximal to ferrule 16B.

Exemplary harnessing member 134A includes a curved and contoured surface 135A (e.g., a quadrant shaped surface 135A) that extends from a position that is proximal to first sidewall 126 to a position that is proximal to cable channel 130. Similarly, exemplary harnessing member 134B includes a curved and contoured surface 135B (e.g., a quadrant shaped surface 135B) that extends from a position that is proximal to second sidewall 128 to a position that is proximal to cable channel 130. In general, exemplary surfaces 135A, 135B also extend or protrude from the insert wall 53.

Exemplary harnessing member 136 includes a curved and contoured surface 137 (e.g., a semi-circle shaped surface 137) that extends from a position that is proximal to ferrule 16A to a position that is proximal to ferrule 16B. Exemplary surface 137 also extends or protrudes from the insert wall 53.

In general, the assembled and secured harnessing members 134A, 134B, 136 provide bend control and reinforcement for fibers 12A, 12B within housing 118A so that connector assembly 10 operates reliably by eliminating macrobend failure of fibers 12A, 12B.

More particularly, when optical fiber 12A exits cable channel 130 and extends to ferrule 16A, the fiber 12A first engages and abuts against the contoured surface 135A of harnessing member 134A, and then engages and abuts against the contoured surface 137 of harnessing member 136, and then extends into ferrule 16A (FIG. 11). As such, fiber 12A abuts against surfaces 135A, 137, and these surfaces 135A, 137 advantageously provide that fiber 12A is substantially straight as fiber 12A exits channel 130, and provides that fiber 12A is substantially straight as fiber 12A enters ferrule 16A, thereby substantially eliminating these two points of stress concentration of fiber 12A. The bends of fiber 12A are controlled by being forced against two rounded surfaces 135A, 137, thereby limiting the overall minimum fiber bend radius of fiber 12A to a tolerable value.

Similarly, when optical fiber 12B exits cable channel 130 and extends to ferrule 16B, the fiber 12B first engages and abuts against the contoured surface 135B of harnessing member 134B, and then engages and abuts against the contoured surface 137 of harnessing member 136, and then extends into ferrule 16B (FIG. 11). As such, fiber 12B abuts against surfaces 135B, 137, and these surfaces 135B, 137 advantageously provide that fiber 12B is substantially straight as fiber 12B exits channel 130, and provides that fiber 12B is substantially straight as fiber 12B enters ferrule 16B, thereby substantially eliminating these two points of stress concentration of fiber 12B. The bends of fiber 12B are controlled by being forced against two rounded surfaces 135B, 137, thereby limiting the overall minimum fiber bend radius of fiber 12B to a tolerable value.

In other embodiments, it is noted that other assemblies/methods of bend control of fibers 12A, 12B can include reinforcing the fibers 12A, 12B with furcation tubing, shrink tubing, molded tube form or a wire coil to resist the fibers 12A, 12B natural tendency to bend sharply.

FIGS. 12-15 show images of exemplary testing set-ups for various connector assemblies 10. The present disclosure provides for advantageous systems and methods for detecting macrobend issues associated with connector assemblies 10 (or 200) or the like.

In exemplary embodiments, the present disclosure provides for a "push-in" test as a means of detecting latent macrobend issues associated with connector assemblies 10, 200. More particularly, by forcing the Device Under Test ("DUT") connector 10 (or 200) into the test adapter 90, the ferrule travel of DUT connector 10 is artificially increased.

Therefore, any bend-compromised DUT connector 10 will show a characteristic rise in insertion loss at the greater wavelength being monitored (e.g., usually 1550 nm in single mode fiber testing; about 1300 nm for multimode fiber testing). This is because any bend within the DUT connector 10 will be forced to tighten as the ferrule travel increases, increasing the amount of bend-induced loss detected. Thus and in exemplary embodiments, using no additional equipment, the test operator can instantly identify any loss-inducing macrobends within the terminated DUT connector 10, and diagnose the severity of any macrobends found. This test method has proven effective as a screening test.

Figure 12:
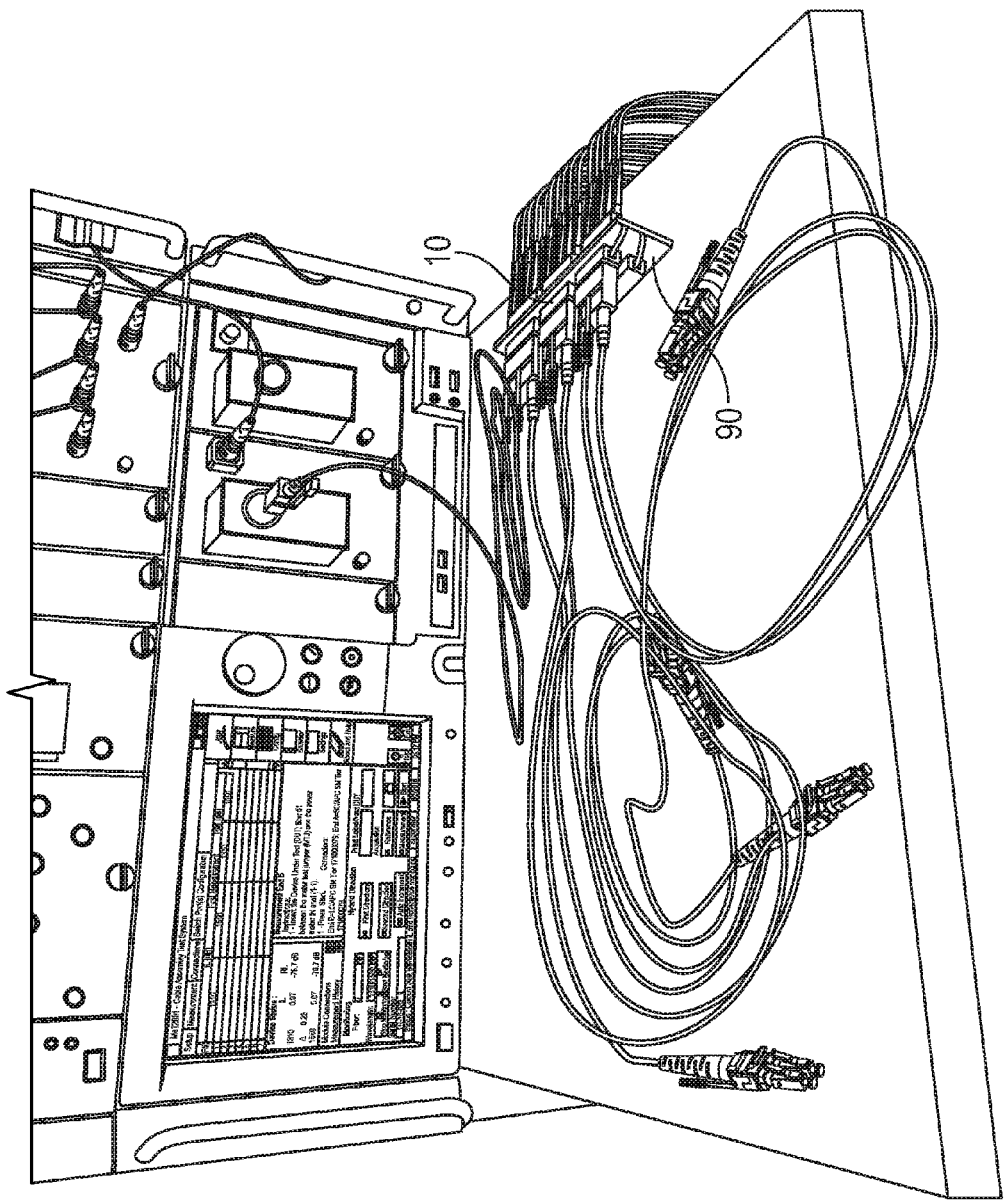
FIG. 12 is an image showing an exemplary connector assembly testing set-up.
Figure 13:
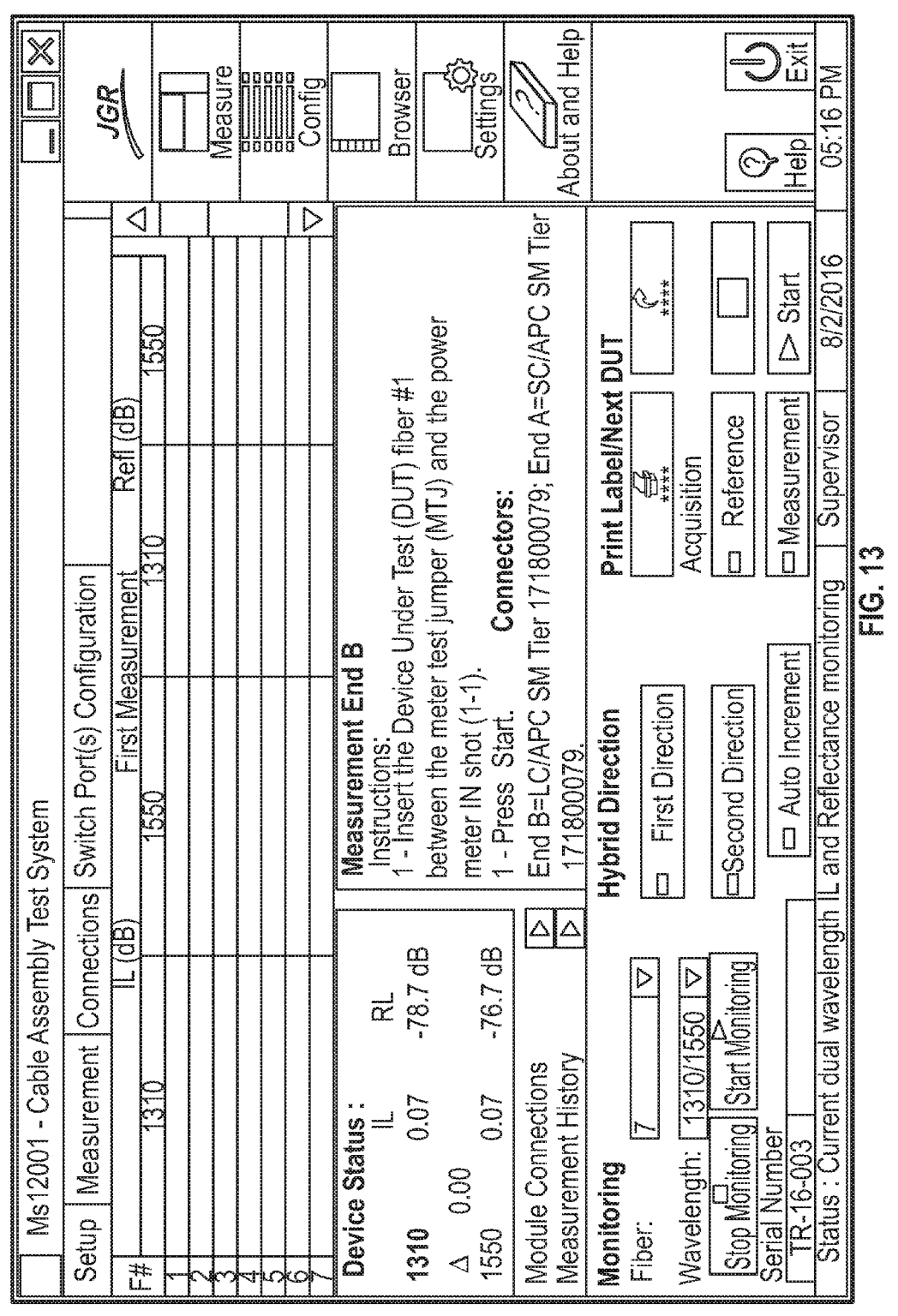

FIGS. 12-15 show images demonstrating an exemplary test method for detecting macrobends within connectors 10 or the like. FIG. 12 shows a conventional DUT setup. In FIGS. 12-13, the live insertion loss (IL) and return loss (RL) values in the top left of the image are noted (0.07 dB IL at 1550 nm).

Figure 14:
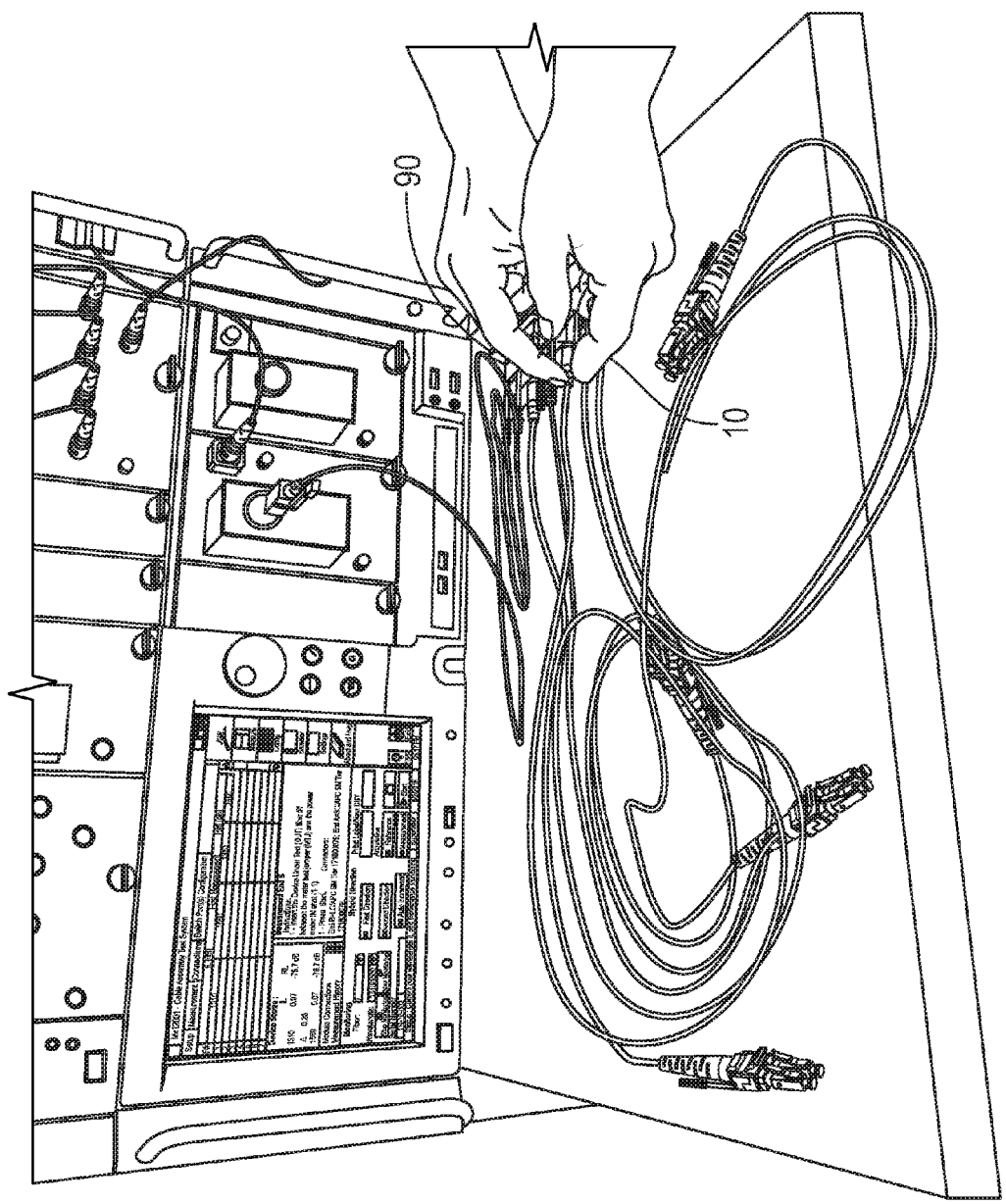
FIG. 14 is another image showing an exemplary connector assembly testing set-up.

FIG. 14 is the same DUT connector 10 with the "push-in" applied. The DUT connector 10 (on the left side of the adapter 90) is being forced into the adapter 90, as the operator holds the adapter 90 steady with his other hand. In other embodiments, it is noted that a fixture or the like could be utilized to hold the adapter steady.

Figure 15:
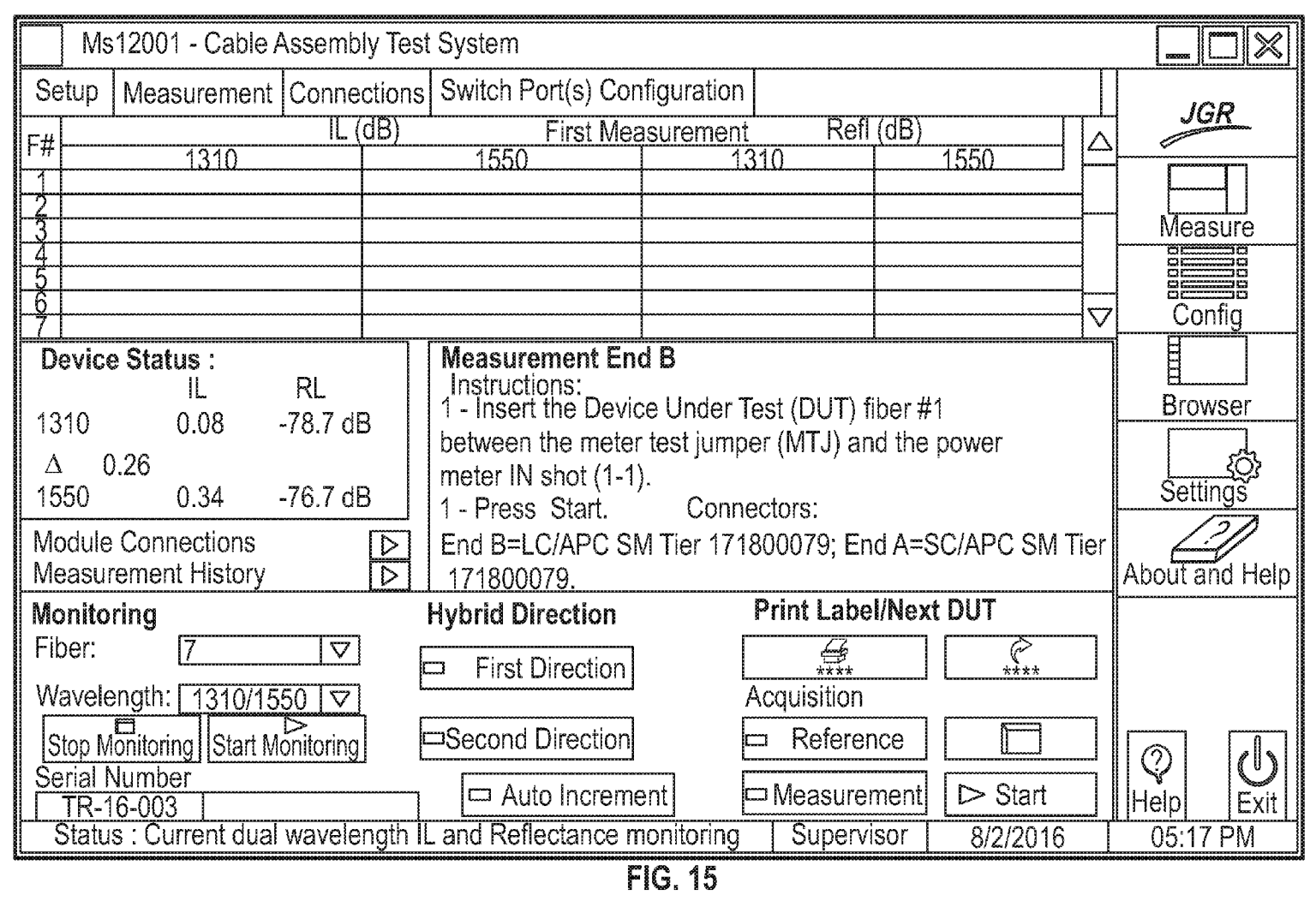

As shown in FIGS. 14-15, the noted increase in IL, particularly at 1550 nm (0.34 dB), is characteristic of bend-induced loss. A connector 10 which was not susceptible to macrobending would show little or no change in IL during such a test. FIG. 15 is a close-up of a testing screen from FIG. 14. As one can see, this test can be conducted in real-time, yielding immediate results which can be used to screen out potential defects based upon appropriate pass/fail criteria, which would vary on the basis of particular product characteristics and reliability objectives. It is noted that the monitored wavelength can be about 1550 nm for singlemode fiber testing and about 1300 nm for multimode fiber testing.

With reference to FIGS. 16-20, there is illustrated another embodiment of an exemplary connector assembly 200 according to the present disclosure.

Current practice provides that with the push for higher LC connector density at the patch panel, LC duplex adapters have been progressively supplanted by LC quad adapters. In general, LC quad adapters have the same LC-to-LC spacing as a duplex adapter, only with twice the number of LC positions (four). The patch cords which mate to these adapters can be LC duplex "uniboot" connectors, with two LC interfaces sharing a common connector boot, with a single cable exiting the rear of the connector. This reduces the number of cable leads coming out of the patch panel by half. Exemplary connector assembly 200 is a LC quad uniboot connector assembly 200, which in patch cord arrays featuring LC quad adapters, can advantageously reduce the number of cable leads by half again compared to using LC duplex uniboots.

Exemplary connector assembly 200 provides that four LC connector interface members 244A, 244B, 244C, 244D share a single connector boot, which advantageously controls the contact spacing so as to match that of a LC quad adapter.

In general, connector assembly 200 is configured and dimensioned to hold/house optical fibers 212A, 212B, 212C, 212D of an optical fiber cable 214 (e.g., four-fiber cable 214), and is configured to align the optical fibers 212A, 212B, 212C, 212D for mating/connecting via ferrules 216A, 216B, 216C, 216D. Ferrules 216A, 216B, 216C, 216D can include or are mounted to interface members 244A, 244B, 244C, 244D (e.g., LC connector interface members 244A, 244B, 244C, 244D).

Exemplary connector assembly 200 takes the form of an LC type quad uniboot connector assembly 200 or the like, although the present disclosure is not limited thereto.

Exemplary connector assembly 200 includes housing members 218A, 218B (e.g., backshell housing members 218A, 218B). In general, housing members 218A, 218B are configured to mate to one another, and are configured to provide an internal region or area 220 for housing optical fibers 212A, 212B, 212C, 212D.

In exemplary embodiments and as shown in FIGS. 17-20, the internal region/area 220 of housing 218A extends from a first end 222 to a second end 224, and includes a first sidewall 226 and a second sidewall 228, the first and second sidewalls 226, 228 extending perpendicular to a base wall 223 (e.g., planar base wall 223) of region 220.

Figure 17:
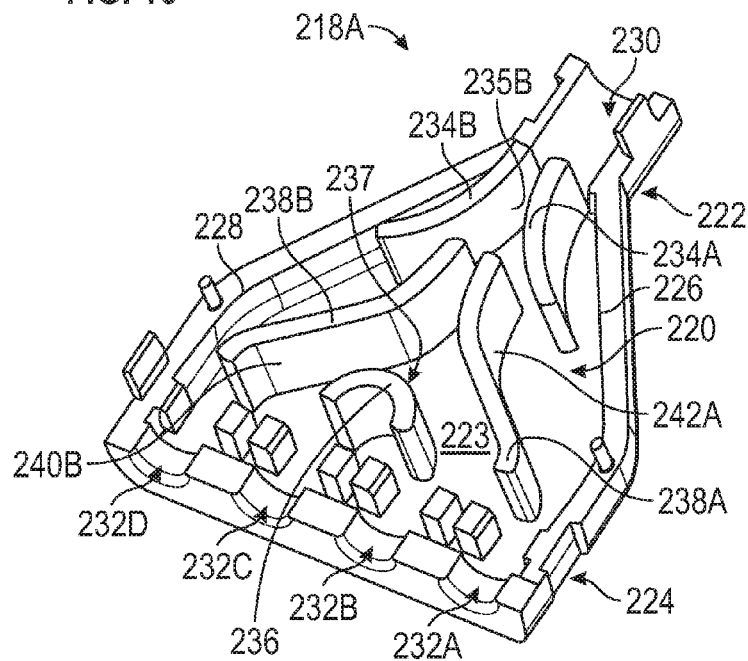
FIG. 17 is a top perspective view of an exemplary housing member having harnessing members.
Figure 18:
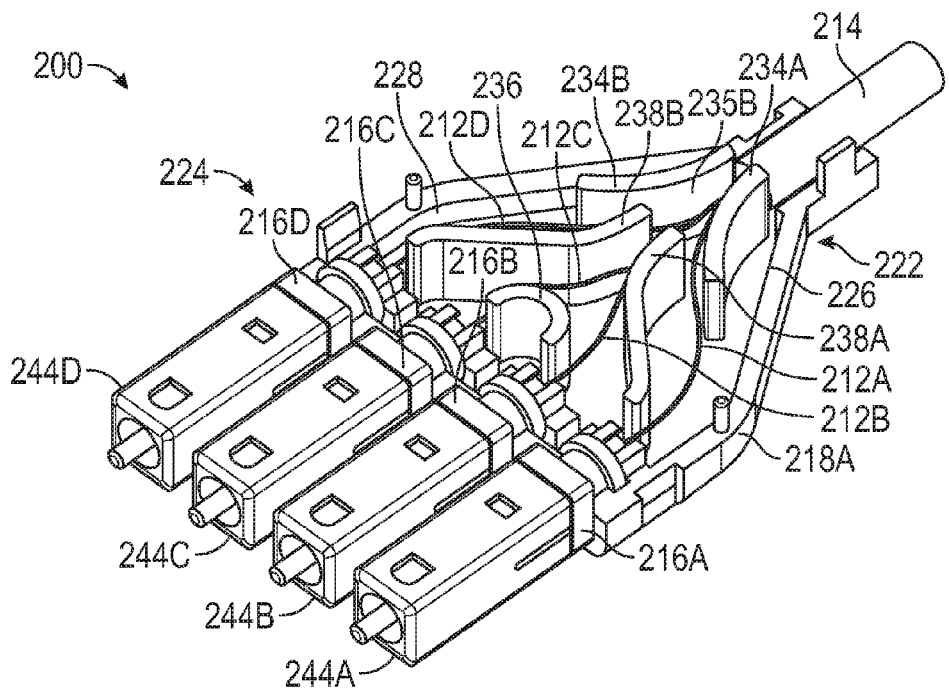
FIG. 18 is a partial top perspective view of the connector assembly of FIG. 16.

As shown in FIG. 17, the first end 222 of the internal region 220 is connected to cable channel 230, and the second end 224 of the internal region 220 is connected to ferrule channels 232A, 232B, 232C, 232D. In exemplary embodiments, optical fiber cable 214 is configured to be positioned within cable channel 230, ferrule 216A is configured to be positioned within ferrule channel 232A, ferrule 216B is configured to be positioned within ferrule channel 32B, ferrule 216C is configured to be positioned within ferrule channel 232C, and ferrule 216D is configured to be positioned within ferrule channel 232D. As such, optical fiber 212A is configured to exit cable 214 and extend to ferrule 216A, optical fiber 212B is configured to exit cable 214 and extend to ferrule 216B, optical fiber 212C is configured to exit cable 214 and extend to ferrule 216C, and optical fiber 212D is configured to exit cable 214 and extend to ferrule 216D.

In exemplary embodiments, the first end 222 of internal region 220 includes harnessing members 234A, 234B that extend or protrude from the base wall 223, the second end 224 of internal region 220 includes harnessing member 236 that extends or protrudes from base wall 23, and internal region 220 includes harnessing members 238A, 238B that extend or protrude from the base wall 223.

In certain embodiments, harnessing member 234A is positioned proximal to first sidewall 226, proximal to first end 222 and proximal to cable channel 230. Exemplary harnessing member 234B is positioned proximal to second sidewall 228, proximal to first end 222 and proximal to cable channel 230. Harnessing member 236 is positioned proximal to second end 224, and extends from a position that is proximal to ferrule 216B to a position that is proximal to ferrule 216C. Exemplary harnessing member 238A extends from a position that is proximal to ferrule 216A to a position that is proximal to harnessing member 234A along or near first end 222. Harnessing member 238B extends from a position that is proximal to ferrule 216D to a position that is proximal to harnessing member 234B along or near first end 222.

Exemplary harnessing member 234A includes a curved and contoured surface 235A that extends from a position that is proximal to first sidewall 226 and proximal to harnessing member 238A to a position that is proximal to cable channel 230. Similarly, exemplary harnessing member 234B includes a curved and contoured surface 235B that extends from a position that is proximal to second sidewall 228 and proximal to harnessing member 238B to a position that is proximal to cable channel 30. In general, exemplary surfaces 235A, 235B also extend or protrude from the base wall 223.

Exemplary harnessing member 236 includes a curved and contoured surface 237 (e.g., a semi-circle shaped surface 237) that extends from a position that is proximal to ferrule 216B to a position that is proximal to ferrule 216C. Exemplary surface 237 also extends or protrudes from the base wall 223.

Figure 20:
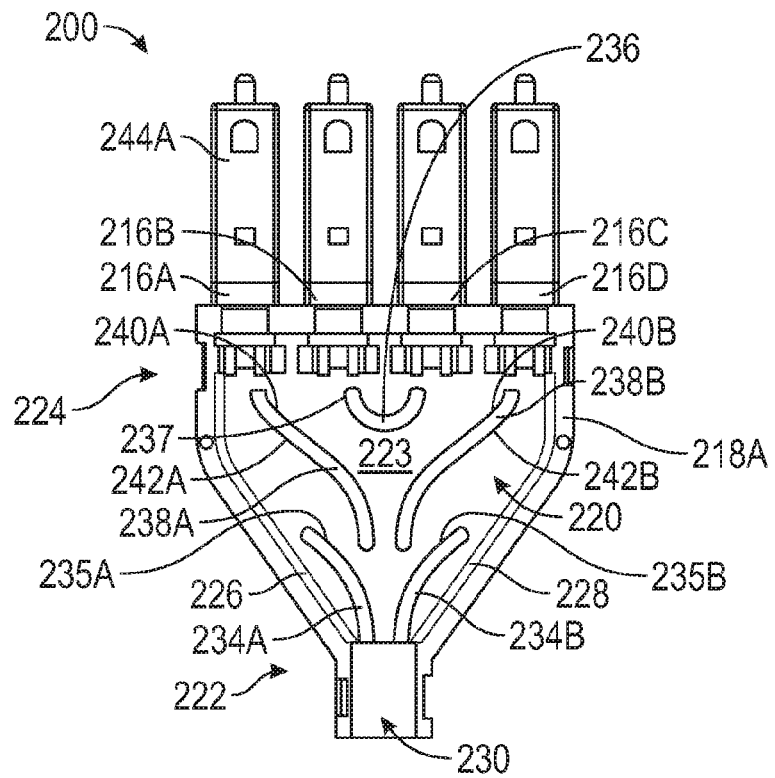

As shown in FIG. 20, exemplary harnessing member 238A includes an interior curved/contoured surface 240A that extends from a position that is proximal to ferrule 216A to a position that is proximal to harnessing member 234A along or near first end 222, and includes an exterior curved/contoured surface 242A that extends from a position that is proximal to ferrule 216A to a position that is proximal to harnessing member 234A along or near first end 222. Exemplary surfaces 240A, 242A also extend/protrude from the base wall 223.

As depicted in FIG. 20, exemplary harnessing member 238B includes an interior curved/contoured surface 240B that extends from a position that is proximal to ferrule 216D to a position that is proximal to harnessing member 234B along or near first end 222, and includes an exterior curved/contoured surface 242B that extends from a position that is proximal to ferrule 216D to a position that is proximal to harnessing member 234B along or near first end 222. Exemplary surfaces 240B, 242B also extend/protrude from the base wall 223.

In general, harnessing members 234A, 234B, 236, 238A, 238B provide bend control and reinforcement for fibers 212A, 212B, 212C, 212D within region 220 and/or housing 218A so that connector assembly 200 operates reliably by eliminating macrobend failure of fibers 212A, 212B, 212C, 212D.

Figure 19:
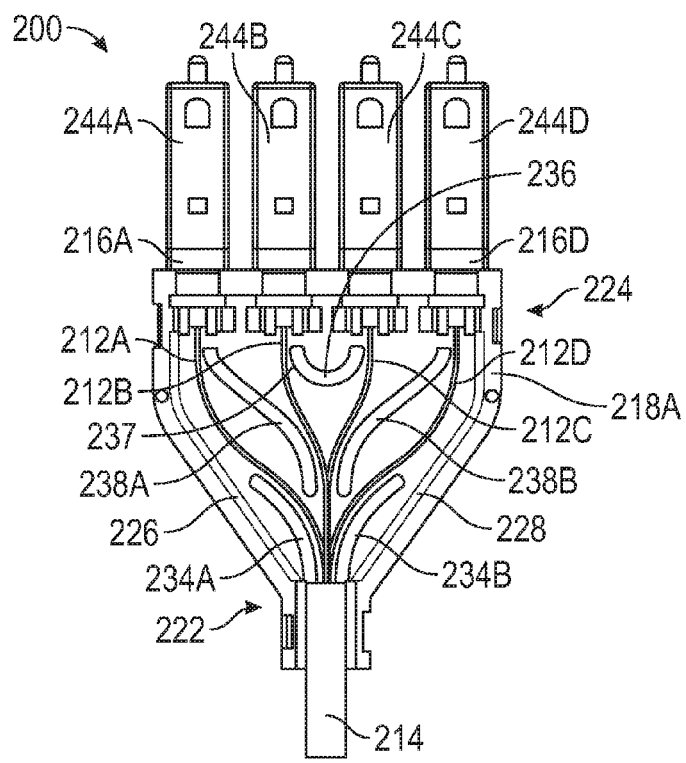
FIGS. 19-20 are partial top views of the connector assembly of FIG. 16.

More particularly, when optical fiber 212A exits cable channel 230 and extends to ferrule 216A, the fiber 212A engages and abuts against the contoured surface 235A of harnessing member 234A, and is positioned between harnessing member 234A and 238A, and then engages and abuts against the contoured surface 242A of harnessing member 238A, and then extends into ferrule 216A (FIG. 19). As such, fiber 212A abuts against surfaces 235A, 242A, and these surfaces 235A, 242A advantageously provide that fiber 212A is substantially straight as fiber 212A exits channel 230, and provides that fiber 212A is substantially straight as fiber 212A enters ferrule 216A, thereby substantially eliminating these two points of stress concentration of fiber 212A.

The bends of fiber 212A are controlled by being forced against two contoured surfaces 235A, 242A, thereby limiting the overall minimum fiber bend radius of fiber 212A to a tolerable value.

When optical fiber 212B exits cable channel 230 and extends to ferrule 216B, the fiber 212B is positioned between the surface 240A of member 238A and the surface 240B of member 238B, and then engages and abuts against the contoured surface 237 of harnessing member 236, and then extends into ferrule 216B (FIG. 19). As such, fiber 212B abuts against surfaces 240A, 237, and these surfaces 240A, 237 advantageously provide that fiber 212B is substantially straight as fiber 212B exits channel 230, and provides that fiber 212B is substantially straight as fiber 212B enters ferrule 216B, thereby substantially eliminating these two points of stress concentration of fiber 212B. The bends of fiber 212B are controlled by being forced against two contoured surfaces 240A, 237, thereby limiting the overall minimum fiber bend radius of fiber 212B to a tolerable value.

Similar to fiber 212B, when optical fiber 212C exits cable channel 230 and extends to ferrule 216C, the fiber 212C is positioned between the surface 240A of member 238A and the surface 240B of member 238B, and then engages and abuts against the contoured surface 237 of harnessing member 236, and then extends into ferrule 216C (FIG. 19). As such, fiber 212C abuts against surfaces 240B, 237, and these surfaces 240B, 237 advantageously provide that fiber 212C is substantially straight as fiber 212C exits channel 230, and provides that fiber 212C is substantially straight as fiber 212C enters ferrule 216C, thereby substantially eliminating these two points of stress concentration of fiber 212C. The bends of fiber 212C are controlled by being forced against two contoured surfaces 240B, 237, thereby limiting the overall minimum fiber bend radius of fiber 212C to a tolerable value.

Similar to fiber 212A, when optical fiber 212D exits cable channel 230 and extends to ferrule 216D, the fiber 212D engages and abuts against the contoured surface 235B of harnessing member 234B, and is positioned between harnessing member 234B and 238B, and then engages and abuts against the contoured surface 242B of harnessing member 238B, and then extends into ferrule 216D (FIG. 19). As such, fiber 212D abuts against surfaces 235B, 242B, and these surfaces 235B, 242B advantageously provide that fiber 212D is substantially straight as fiber 212D exits channel 230, and provides that fiber 212D is substantially straight as fiber 212D enters ferrule 216D, thereby substantially eliminating these two points of stress concentration of fiber 212D. The bends of fiber 212D are controlled by being forced against two contoured surfaces 235D, 242D, thereby limiting the overall minimum fiber bend radius of fiber 212D to a tolerable value.

Without harnessing members 234A, 234B, 238A, 238B, 236, the displacement of the ferrule 216A, 216B, 216C, 216D (particularly 216A, 216D) positions from the main cable 214 axis would make such an open interior 220 susceptible to kinking of the fibers 212A, 212B, 212C, 212D (e.g., during mating and cleaning of the connector assembly).

Internal bend control of the fibers 212A, 212B, 212C, 212D is important (particularly 212A, 212D), even in some instances when using buffered fiber.

In exemplary embodiments, the harnessing members 234A, 234B, 238A, 238B, 236 extend the full height of the internal region 220—from the base wall 223 of housing member 218A to the base wall 252 of housing member 218B' or 218 (FIG. 21), so as to ensure the flexural load on the fibers 212A, 212B, 212C, 212D is broadly distributed, and that the minimum bend radius of the fibers 212A, 212B, 212C, 212D remains tolerable.

In other embodiments, it is noted that the harnessing members 234A, 234B, 238A, 238B, 236 may not extend the full height of the internal region 220.

In exemplary embodiments and as noted above, the harnessing members 234A, 234B, 238A, 238B, 236 extend from base wall 223 of housing member 218A.

Figure 21:
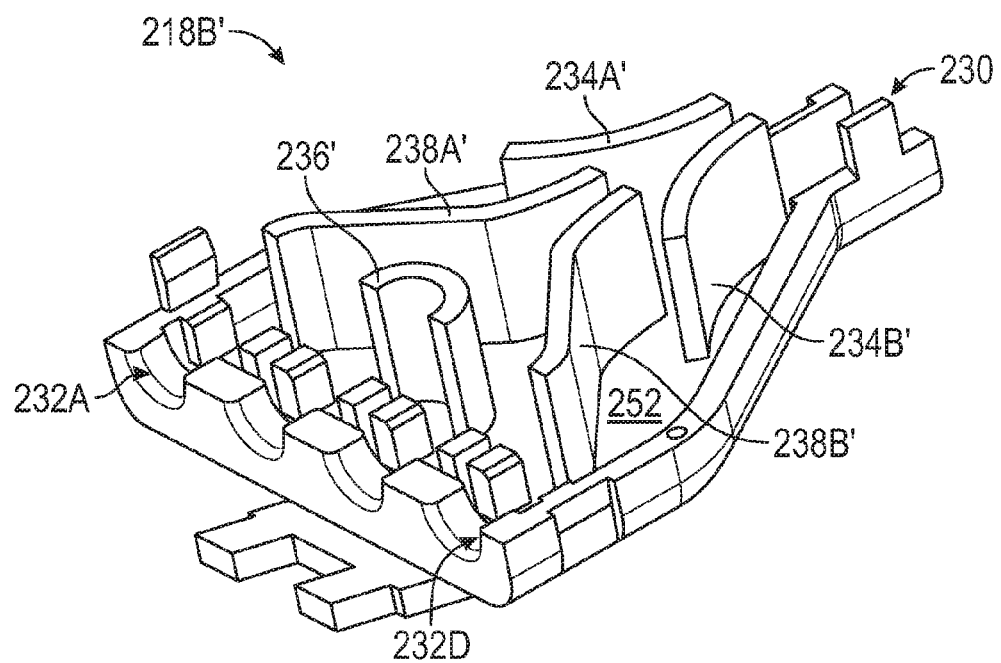
FIG. 21 is a bottom perspective view of an exemplary housing member having harnessing members.

In other embodiments and as depicted in FIG. 21, the harnessing members 234A', 234B', 238A', 238B', 236' extend from base wall 252 of housing member 218B (and housing member 218A would not include the harnessing members).

In other embodiments, at least of portion of housing members 218A and 218B include portions or elements of harnessing members 234A, 234B, 238A, 238B and/or 236 (e.g., members 234A, 234B, 238A, 238B on member 218A and member 236 on member 218B, and other combinations/permutations, etc.).

Referring back to FIGS. 9-11, it is also noted that harnessing members similar to harnessing members 234A, 234B, 238A, 238B, 236 or the like could be positioned or included on a separate insert member or the like (e.g., similar to insert member 50 discussed above), and such separate insert member or the like can be inserted into internal region 220 of housing 218A, 218B of connector assembly 200 as similarly discussed above in connection with FIGS. 9-11 (e.g., can be sized to fit tightly within internal region 220 and secured in place and provide bend control to fibers 212A, 212B, 212C, 212D).

Referring back to FIG. 16 and in certain embodiments and for ergonomic reasons, interface members 244A and 244D do not mount to latching member 248 of housing member 218B (e.g., they do not include or mount to latches), while interface members 244B, 244C mount to latches 246B, 246C, respectively (FIG. 16). As such and as shown in FIG. 16, exemplary latches 246B, 246C can be a part of the latching member 248 of the housing member 218B.

Figure 16:
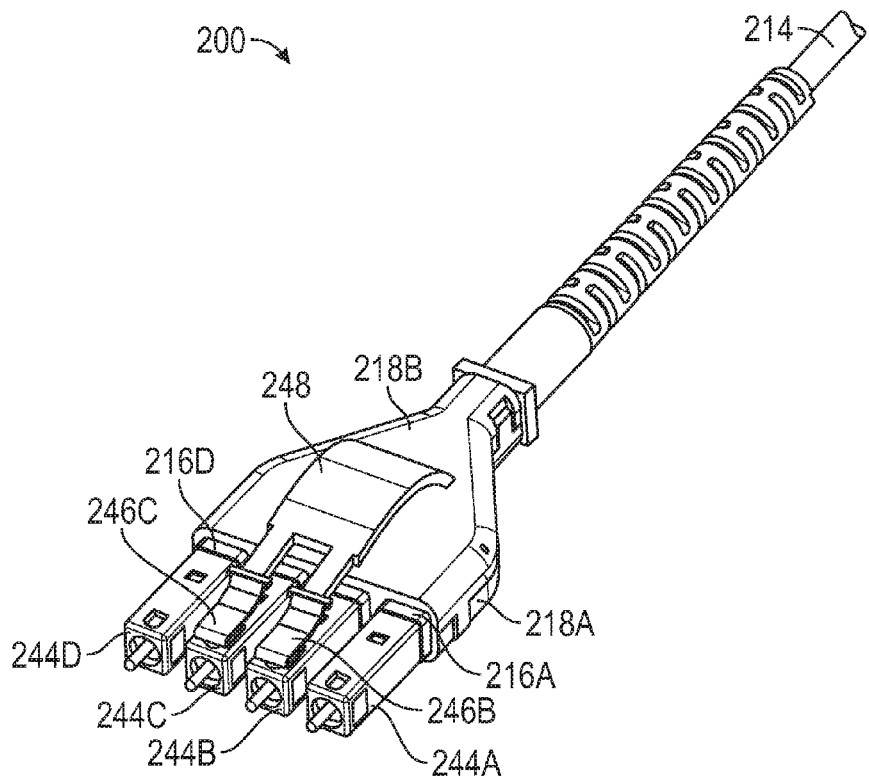
FIG. 16 is a top perspective view of another exemplary connector assembly utilizing advantageous internal harnessing members of the present disclosure.

In this embodiment and as shown in FIG. 16, the outer interface members 244A, 244D do not mount to latching member 248, and inner interface members 244B, 244C are mounted to latches 246B, 246C, and the latches 246B, 246C are linked together or connected to one another via latching member 248 (e.g., push tab latching member 248) that extends or protrudes from housing member 218B. These two exemplary latching points of 244B to 246B and 244C to 246C are sufficiently robust for the proper mating depth of the interface members 244A, 244D that are not latched to latching member 248.

Exemplary latching member 248 of housing member 218B couples the two latches 246B, 246C together and allows the two latches 246B, 246C to be depressed simultaneously, and the latches 246B, 246C themselves can be integral with latching member 248.

Thus, connector assembly 200 advantageously provides for a four-fiber connector assembly 200 which is ergonomically comfortable, and which greatly reduces cabling requirements at the patch panel or the like.

As such, connector assembly 200 provides interface members 244B, 246C configured to mount to latches 246B, 246C, and provides for interface members 244A, 244D that do not include latches, or are not configured to mount to member 248. It is noted that members 244A and/or 244D could also be configured to mount to latches similar to latches 246B, 246C of latching member 248 or the like.

As such, it is noted that member 248 could include any suitable number of latches similar to latches 246B, 246C to mount to members 244A, 244B, 244C, and/or 244D (e.g., two, three, four latches) in a variety of positions or permutations (e.g., to 244A and to 244D and not to 244B and not to 244C; to 244A, 244B, 244C and to 244D; etc.).

Figure 22:
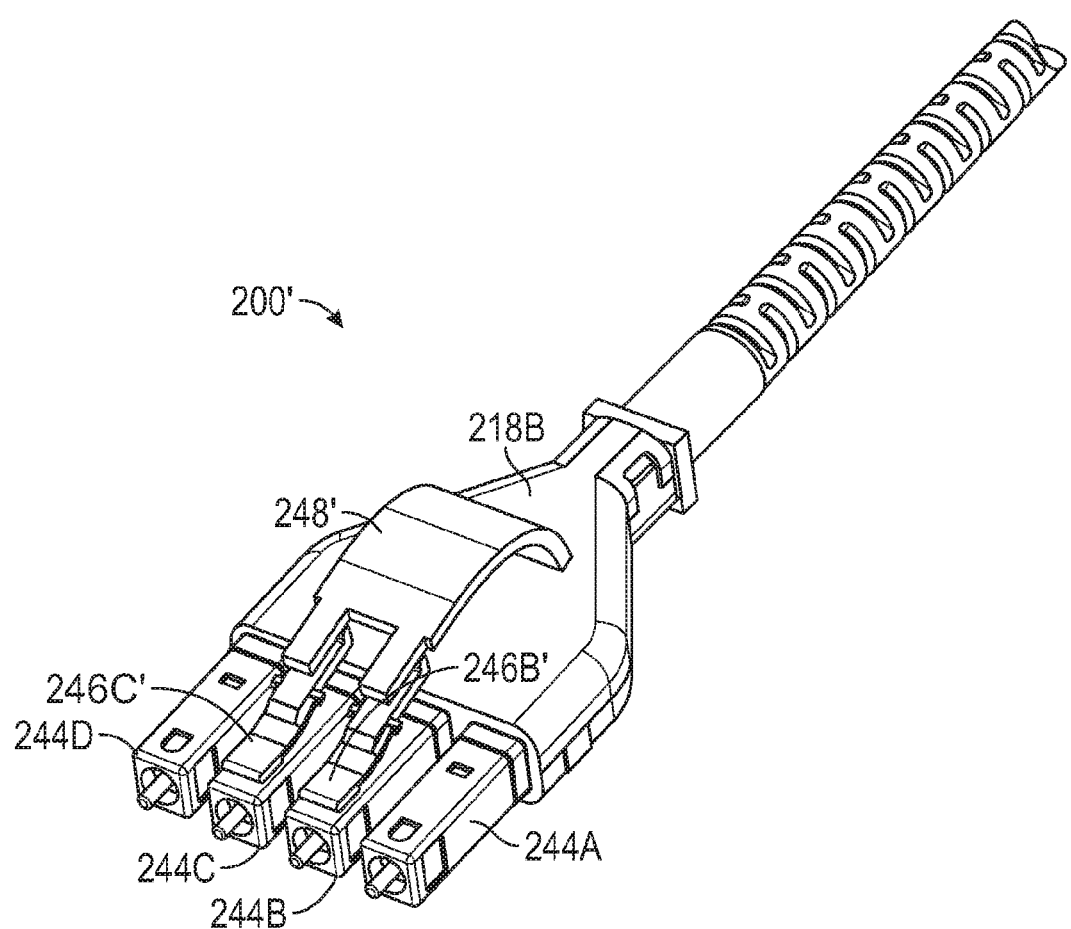
FIG. 22 is a top perspective view of another exemplary connector assembly utilizing advantageous internal harnessing members of the present disclosure.

In other embodiments and as shown in FIG. 22, it is noted that interface member 244B can include latch 246B' and interface member 244C can include latch 246C', with the latches 246B', 246C' configured to mount or connect to latching member 248' of housing member 218B of connector assembly 200'.

As such, latching member 248' of housing member 218B couples the two latches 246B', 246C' together and allows the two latches 246B', 246C' to be depressed simultaneously, and the latches 246B', 246C' themselves are on a respective interface member 244B, 244C.

Thus, connector assembly 200' provides interface members 244B, 246C having latches 246B', 246C', and provides for interface members 244A, 244D without latches. It is noted that members 244A and/or 244D (and/or members 244B, 244C) could also include latches similar to latches 246B', 246C' that are configured to connect to latching member 248' or the like.

As such, it is noted that assembly 200' could include any suitable number of latches similar to latches 246B', 246C' on the members 244A, 244B, 244C, and/or 244D (e.g., two, three, four latches) in a variety of positions or permutations (e.g., on 244A and 244D and not on 244B and 244C; on 244A, 244B, 244C and on 244D; etc.).

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A connector assembly comprising:
a housing having an internal region that extends from a first end to a second end and includes a first sidewall and a second sidewall, the first end of the internal region connected to a cable channel and the second end of the internal region connected to a first ferrule channel and to a second ferrule channel;
a cable positioned within the cable channel;
a first ferrule positioned within the first ferrule channel and a second ferrule positioned within the second ferrule channel;
a first optical fiber extending from the cable to the first ferrule, and a second optical fiber extending from the cable to the second ferrule;
a first harnessing member disposed in the internal region and positioned proximal to the first sidewall, the first end and the cable channel, the first harnessing member including a first curved surface;
a second harnessing member disposed in the internal region and positioned proximal to the second sidewall, the first end and the cable channel, the second harnessing member including a second curved surface;
a third harnessing member disposed in the internal region and positioned proximal to the second end, the third harnessing member including a third curved surface, the third curved surface of the third harnessing member positioned and only extending proximal to the second end of the internal region;
wherein the first curved surface of the first harnessing member extends from a position proximal to the first sidewall to a position proximal to the cable channel, the first curved surface of the first harnessing member positioned and only extending proximal to the first end of the internal region;
wherein the second curved surface of the second harnessing member extends from a position proximal to the second sidewall to a position proximal to the cable channel, the second curved surface of the second harnessing member positioned and only extending proximal to the first end of the internal region;
wherein when the first optical fiber extends from the cable to the first ferrule (i) the first optical fiber engages and abuts against the first curved surface of the first harnessing member only at the first end of the internal region, (ii) and the first optical fiber engages and abuts against the third curved surface of the third harnessing member only at the second end of the internal region, and (iii) the first optical fiber can extend and engage the first sidewall after extending from the first curved surface of the first harnessing member to the first ferrule, thereby allowing the first optical fiber a range of motion out to the first sidewall from the first harnessing member to the first ferrule;
wherein when the second optical fiber extends from the cable to the second ferrule (i) the second optical fiber engages and abuts against the second curved surface of the second harnessing member only at the first end of the internal region, (ii) and the second optical fiber engages and abuts against the third curved surface of the third harnessing member only at the second end of the internal region, and (iii) the second optical fiber can extend and engage the second sidewall after extending from the second curved surface of the second harnessing member to the second ferrule, thereby allowing the second optical fiber a range of motion out to the second sidewall from the second harnessing member to the second ferrule.

2. The assembly of claim 1, wherein the housing includes a first housing member and a second housing member defining and enclosing the internal region, the housing defining an LC type uniboot housing; and
wherein the cable is a two-fiber cable.

3. The assembly of claim 1, wherein the first and second sidewalls extend perpendicular from a base wall of the internal region;
wherein the first, second and third harnessing members extend and protrude from the base wall of the internal region; and
wherein the first, second and third curved surfaces extend and protrude from the base wall of the internal region.

4. The assembly of claim 1, wherein the first and second curved surfaces are quadrant shaped surfaces; and wherein the third curved surface is a semi-circle shaped surface.

5. The assembly of claim 1, wherein the third curved surface extends from a position proximal to the first ferrule to a position proximal to the second ferrule.

6. The assembly of claim 1, wherein the first, second and third harnessing members extend and protrude from an insert wall of an insert member, the insert member configured and dimensioned to be disposed and secured within the internal region of the housing.

7. A method for fabricating a connector assembly comprising:
- providing a housing having an internal region that extends from a first end to a second end and includes a first sidewall and a second sidewall, the first end of the internal region connected to a cable channel and the second end of the internal region connected to a first ferrule channel and to a second ferrule channel;
- positioning a cable within the cable channel;
- positioning a first ferrule within the first ferrule channel;
- positioning a second ferrule within the second ferrule channel;
- extending a first optical fiber from the cable to the first ferrule;
- extending a second optical fiber from the cable to the second ferrule;
- disposing and positioning a first harnessing member in the internal region proximal to the first sidewall, the first end and the cable channel, the first harnessing member including a first curved surface;
- disposing and positioning a second harnessing member in the internal region proximal to the second sidewall, the first end and the cable channel, the second harnessing member including a second curved surface;
- disposing and positioning a third harnessing member in the internal region proximal to the second end, the third harnessing member including a third curved surface, the third curved surface of the third harnessing member positioned and only extending proximal to the second end of the internal region;
- wherein the first curved surface of the first harnessing member extends from a position proximal to the first sidewall to a position proximal to the cable channel, the first curved surface of the first harnessing member positioned and only extending proximal to the first end of the internal region;
- wherein the second curved surface of the second harnessing member extends from a position proximal to the second sidewall to a position proximal to the cable channel, the second curved surface of the second harnessing member positioned and only extending proximal to the first end of the internal region;
- wherein when the first optical fiber extends from the cable to the first ferrule (i) the first optical fiber engages and abuts against the first curved surface of the first harnessing member only at the first end of the internal region, (ii) and the first optical fiber engages and abuts against the third curved surface of the third harnessing member only at the second end of the internal region, and (iii) the first optical fiber can extend and engage the first sidewall after extending from the first curved surface of the first harnessing member to the first ferrule, thereby allowing the first optical fiber a range of motion out to the first sidewall from the first harnessing member to the first ferrule;
- wherein when the second optical fiber extends from the cable to the second ferrule (i) the second optical fiber engages and abuts against the second curved surface of the second harnessing member only at the first end of the internal region, (ii) and the second optical fiber engages and abuts against the third curved surface of the third harnessing member only at the second end of the internal region, and (iii) the second optical fiber can extend and engage the second sidewall after extending from the second curved surface of the second harnessing member to the second ferrule, thereby allowing the second optical fiber a range of motion out to the second sidewall from the second harnessing member to the second ferrule.

8. A connector assembly comprising:
- a housing having an internal region that extends from a first end to a second end and includes a first sidewall and a second sidewall, the first end of the internal region connected to a cable channel and the second end of the internal region connected to a first ferrule channel, a second ferrule channel, a third ferrule channel and a fourth ferrule channel;
- a cable positioned within the cable channel;
- a first ferrule positioned within the first ferrule channel, a second ferrule positioned within the second ferrule channel, a third ferrule positioned within the third ferrule channel, and a fourth ferrule positioned within the fourth ferrule channel;
- a first optical fiber extending from the cable to the first ferrule, a second optical fiber extending from the cable to the second ferrule, a third optical fiber extending from the cable to the third ferrule, and a fourth optical fiber extending from the cable to the fourth ferrule;
- a first harnessing member disposed in the internal region and positioned proximal to the first sidewall, the first end and the cable channel, the first harnessing member including a first curved surface;
- a second harnessing member disposed in the internal region and positioned proximal to the second sidewall, the first end and the cable channel, the second harnessing member including a second curved surface;
- a third harnessing member disposed in the internal region and positioned proximal to the second end, the third harnessing member including a third curved surface, the third curved surface of the third harnessing member positioned and only extending proximal to the second end of the internal region;
- a fourth harnessing member disposed in the internal region, the fourth harnessing member extending from a position proximal to the first ferrule to a position proximal to the first end of the internal region, the fourth harnessing member including an exterior curved surface and an interior curved surface;
- a fifth harnessing member disposed in the internal region, the fifth harnessing member extending from a position proximal to the fourth ferrule to a position proximal to the first end of the internal region, the fifth harnessing member including an exterior curved surface and an interior curved surface;
- wherein the first curved surface of the first harnessing member extends from a position proximal to the first sidewall to a position proximal to the cable channel, the first curved surface of the first harnessing member positioned and only extending proximal to the first end of the internal region;
- wherein the second curved surface of the second harnessing member extends from a position proximal to the second sidewall to a position proximal to the cable channel, the second curved surface of the second harnessing member positioned and only extending proximal to the first end of the internal region;

wherein when the first optical fiber extends from the cable to the first ferrule (i) the first optical fiber engages and abuts against the first curved surface of the first harnessing member only at the first end of the internal region, (ii) and the first optical fiber engages and abuts against the exterior curved surface of the fourth harnessing member only at the second end of the internal region, and (iii) the first optical fiber can extend and engage the first sidewall after extending from the first curved surface of the first harnessing member to the first ferrule, thereby allowing the first optical fiber a range of motion out to the first sidewall from the first harnessing member to the first ferrule;

wherein when the second optical fiber extends from the cable to the second ferrule, the second optical fiber engages and abuts against the interior curved surface of the fourth harnessing member and the third curved surface of the third harnessing member;

wherein when the third optical fiber extends from the cable to the third ferrule, the third optical fiber engages and abuts against the interior curved surface of the fifth harnessing member and the third curved surface of the third harnessing member; and wherein when the fourth optical fiber extends from the cable to the fourth ferrule (i) the fourth optical fiber engages and abuts against the second curved surface of the second harnessing member only at the first end of the internal region, (ii) and the fourth optical fiber engages and abuts against the exterior curved surface of the fifth harnessing member only at the second end of the internal region, and (iii) the fourth optical fiber can extend and engage the second sidewall after extending from the second curved surface of the second harnessing member to the fourth ferrule, thereby allowing the fourth optical fiber a range of motion out to the second sidewall from the second harnessing member to the fourth ferrule.

9. The assembly of claim 8, wherein the housing includes a first housing member and a second housing member defining and enclosing the internal region, the housing defining an LC type uniboot housing; and wherein the cable is a four-fiber cable.

10. The assembly of claim 8, wherein the first and second sidewalls extend perpendicular from a base wall of the internal region;

wherein the first, second, third, fourth and fifth harnessing members extend and protrude from the base wall of the internal region; and wherein the first, second and third curved surfaces extend and protrude from the base wall of the internal region.

11. The assembly of claim 8, wherein the third curved surface is a semi-circle shaped surface; and wherein the third curved surface extends from a position proximal to the second ferrule to a position proximal to the third ferrule.

12. The assembly of claim 11, wherein the second and third ferrules are positioned between the first and fourth ferrules.

13. The assembly of claim 8, wherein the housing includes a first housing member and a second housing member defining and enclosing the internal region, the first housing member including a latching member;

wherein the first ferrule includes a first interface member, the second ferrule includes a second interface member, the third ferrule includes a third interface member, and the fourth ferrule includes a fourth interface member; and wherein the latching member is configured to mount to the second and third interface members.

14. The assembly of claim 13, wherein the second and third interface members are positioned between the first and fourth interface members.

15. The assembly of claim 14, wherein the second interface member includes a first latch and the third interface member includes a second latch, the first and second latches configured to mount to the latching member.

16. The assembly of claim 14, wherein the latching member includes a first latch and a second latch, the first latch configured to mount to the second interface member and the second latch configured to mount to the third interface member.

* * * * *